Aug. 23, 1960  A. B. CRANDALL  2,949,842
AUTOMOBILE WINDOW VENTILATOR
Filed Nov. 21, 1956  2 Sheets-Sheet 1
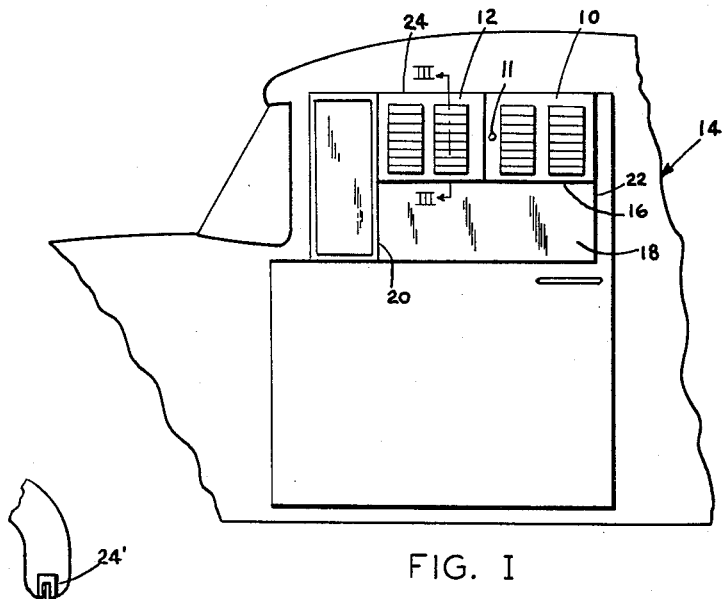
FIG. I
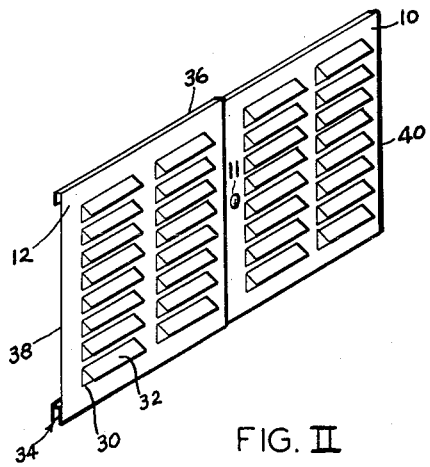
FIG. III  FIG. II
INVENTOR
ARTHUR B. CRANDALL
BY
*C.T. Cross* ATTORNEY Aug. 23, 1960  A. B. CRANDALL  2,949,842
AUTOMOBILE WINDOW VENTILATOR
Filed Nov. 21, 1956  2 Sheets-Sheet 2
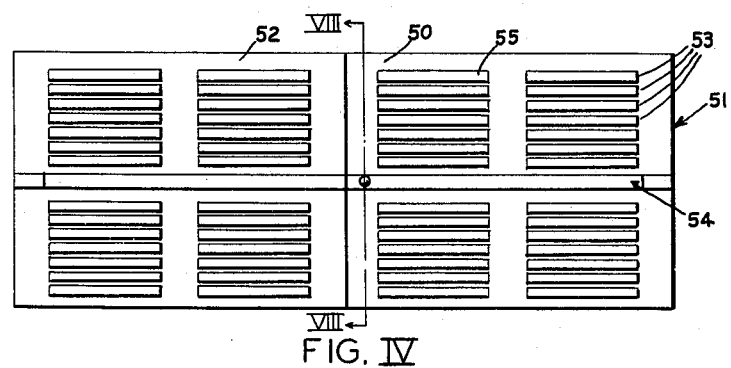
FIG. IV
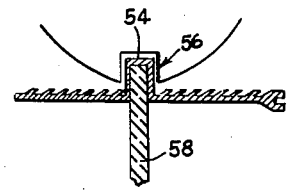
FIG. V
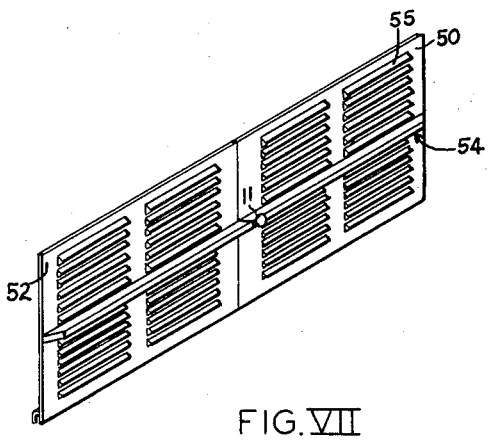
FIG. VI
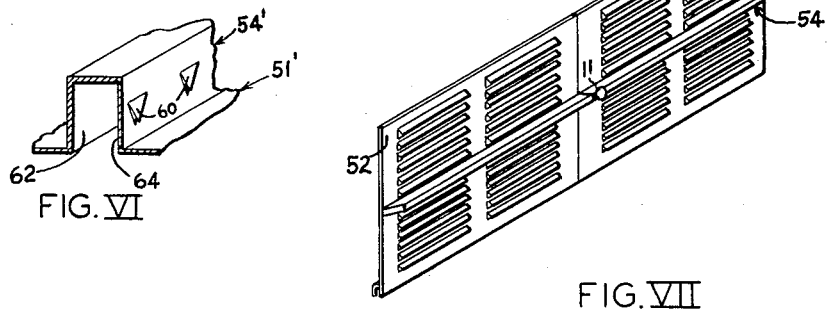
FIG. VII
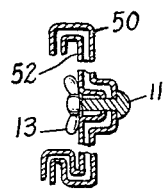
FIG. VIII
INVENTOR
ARTHUR B. CRANDALL
BY
C. T. Cross  ATTORNEY

United States Patent Office 2,949,842
Patented Aug. 23, 1960

2,949,842

AUTOMOBILE WINDOW VENTILATOR

Arthur B. Crandall, 165 Overlook Road, Painesville, Ohio

Filed Nov. 21, 1956, Ser. No. 623,582

5 Claims. (Cl. 98—2)

This invention relates to ventilators for automotive vehicles and more particularly relates to a new and improved ventilator for an enclosed automotive vehicle.

The problem of controlling the temperature within the passenger compartments of automotive vehicles has heretofore received considerable attention and many different types of heaters and air conditioners have been proposed and used with marked success. In addition, various types of air scoops and ventilators or other air flow diverters have been suggested and used.

However, despite this prior activity with power means of effecting ventilation, and with the devices to engage air moving around the vehicle when it is in motion, little attention has heretofore been paid to reducing the temperature normally attained within the passenger compartment of an enclosed, stationary automotive vehicle where power means of ventilation and/or cooling are not practicable. For example, the high temperature attained in the passenger compartment of an automobile remaining stationary with the windows closed during a warm day is well known. Up to the present time, no generally practicable means for reducing the temperature or providing ventilation within enclosed stationary vehicles has, to my knowledge, been known.

The problem of high temperatures encountered in an enclosed stationary vehicle is not practicably solved by the simple expedient of leaving one or more windows open, especially if the vehicle is to be left unattended, since it is thus rendered too easily accessable to pilferage and/or damage or theft. Moreover, as will be appreciated, rain and snow damage is invited by such a procedure. It will also be appreciated that an awning device, while, indeed, affording some protection against entry of moisture, is no protection against pilferage, especially when the window is partially opened.

Accordingly, the present invention has as its principal object the avoidance of the foregoing problems and the provision of a new and improved ventilator adapted to facilitate ventilation in an enclosed, stationary automotive vehicle.

A further object of this invention is to provide a new and improved window ventilator for automotive vehicles.

These and other objects and advantages of this invention will more fully appear from the following description thereof.

Referring now to the accompanying drawings:

Fig. I is a fragmentary view of a ventilator embodying the present invention in place in a window of an automotive vehicle;

Fig. II is a view in perspecitve of a ventilator as shown in Fig. I;

Fig. III is a view, partially in section, of a ventilator of the type shown in Fig. I operatively mounted in the window of an automotive vehicle;

Fig. IV is an elevational view of another embodiment of a ventilator in accordance with the present invention;

Fig. V is a fragmentary, schematic view, partially in section, of a ventilator as in Fig. IV indicating its mounting in a storage position;

Fig. VI is an enlarged, fragmentary, perspective view, partially in section of a poriton of a modified embodiment of a ventilator as in Fig. IV;

Fig. VII is a perspective view of a ventilator as shown in Fig. IV; and

Fig. VIII is a fragmentary, schematic, sectional end view, partially in section, showing a locking means for the ventilator sections.

As shown in the accompanying drawings, a ventilator embodying this invention comprises two slidably-engaged elements each having a plurality of spaced, generally parallel, elongated ventilating openings capable of facilitating movement of air into and out of an automotive vehicle, yet normally precluding the entry of atmospheric moisture. The lower edges of these elements include, in cross section, an inverted U-shaped groove to engage the upper edge of a partially-opened window in the vehicle. The upper edges of the elements are insertable into the inverted U-shaped groove normally occupied by the upper edge of the window when in a closed position.

An especially preferred embodiment of this invention comprises a ventilator which not only facilitates air flow into and out of an enclosed, stationary automotive vehicle, but also is readily storable via a raised or outstanding narrow elongated rib or spar, on either side, by the simple expedient of inserting this spar into the inverted U-shaped groove normally occupied by the vehicle window when closed. It will be appreciated thus that this preferred embodiment not only provides a singularly effective, pilferage-resistant ventilator but also affords a convenient and practical storage means for the ventilator when not in use. Moreover, it will be appreciated that in this storage position a novel and advantageous weather shield or awning is provided which does not interfere with normal raising or lowering of the window. In addition, it will be appreciated that the slidable elements can readily be locked in a desired position in the side grooves normally engaged by the window by means, e.g., a pin 11, provided with a wing nut 13 threadedly engaged thereon, projecting through openings in the spars or ribs thereby precluding sliding of the elements without removal of the pin.

Referring more particularly to the drawings, in Figs. I and III, there is shown a ventilator embodying the invention and comprising, in combination, longitudinally-slidable elements 10 and 12 disposed in an operative position in an automotive vehicle 14 within the opening defined by the upper edge 16 of a vertically-movable window 18, side grooves 20 and 22 in which the window 18 slides, and the upper inverted U-shaped groove 24 in which the window is disposed when closed. The slidable elements 10 and 12 are provided with a plurality of generally parallel, spaced ventilating openings 30 having overhanging sun and moisture shields 32. The lower edges of the elements 10 and 12 comprise an inverted U-shaped groove 34 adapted frictionally to engage the upper edge of the window 18. The upper edges of the elements 10 and 12, typically are rolled over to define a smooth, rounded surface 36 adapted to fit snugly within the inverted U-shaped groove normally receiving the upper edge of the window 18.

In use, a ventilator 23, as shown in Fig. III, is placed in opening defined by a partially-opened window 18' and the slidable elements extended or expanded longitudinally until the ends 38 and 40 fit tightly in the side grooves 20 and 22, respectively. The window 18' is then raised to engage the lower edge 34' of the ventilator and to force the upper edge 36' into the top groove 24'.

Reference is now made to the preferred embodiment of the invention as shown in Figs. IV to VII, inclusive.

The ventilator 51 there shown comprises two slidably engaged elements 50 and 52 provided with a plurality of spaced, generally parallel ventilating openings 53 having shields 55 and provided with horizontally-disposed, outstanding, narrow longitudinal spars or ribs designated generally at 54 located along the horizontal center line of the ventilator. These ribs are narrow, preferably a hollow U-shaped channel, although one section can be solid if desired, and of such proportions as to be securable by frictional engagement in the upper inverted U-shaped groove 56 of an automotive vehicle window, as shown more clearly, although schematically, in Fig. V. This structure permits advantageous and convenient storage of the ventilator when not in use as a means of ventilating an enclosed, stationary vehicle. In the storage position as shown in Fig. V, the ventilator provides a protective awning on the outside of the vehicle window 58 while not objectionable extending into the vehicle.

It will be further appreciated that, if desired, the engagement of the ventilator in the storage position may be with the aid of projections 60 adapted to engage the interior of the upper inverted U-shaped groove normally occupied by the upper edge of the vehicle window when in a closed position and to be released therefrom by inward pressure to force together the sides 62 and 64 of the rib 54'.

It is to be understood that the practice of this invention contemplates that one or more ventilators be employed. A preferred practice involves the use of two or more ventilators on opposite sides of the vehicle to facilitate cross ventilation.

Ventilators embodying this invention may readily be fabricated of sheet metal or other material by simple pressing and edge-forming operations. Ventilators embodying this invention may be formed of various materials, e.g., metal, plastic substance, wood, or the like. However, it will be understood that the ventilators preferably are formed of sheet metal such as steel or aluminum or other strong ferrous or non-ferrous metal or alloy.

It is to be understood that although the invention has been described with specific reference to particular embodiments thereof it is not to be so limited, since changes and alterations therein may be made within the full intended scope of this invention, as defined by the appended claims.

What is claimed is:

1. A ventilator for an enclosed automotive vehicle which is adapted to fit within the space defined by a partially-opened vehicle window, which ventilator comprises a plurality of slidably-engaged elements each having a plurality of ventilating openings therein capable of facilitating movement of air into and out of said vehicle yet normally precluding the entry of rain, and an outstanding rib comprising an open channel throughout its length of a size to fit over the upper edge of the glass vehicle window, said rib extending longitudinally through the center of the said slidably engaged elements, the lower edges of said elements having means thereon throughout their lengths to engage the upper edge of said partially-opened window and the upper edges of said elements having means to engage the upper inverted U-shaped groove normally occupied by the upper edge of said window when in a closed position.

2. A ventilator as in claim 1 wherein means are provided to lock said slidably-engaged elements into a longitudinally-rigid structure.

3. A ventilator as in claim 1 wherein said means include a pin passing through said elements.

4. A ventilator as in claim 1 wherein the said elements are formed of plastic.

5. A ventilator as in claim 1 wherein said rib is provided with means to engage the said upper inverted U-shaped groove when inserted therein, said means comprising outwardly-extending projections from the walls of the outstanding rib.

References Cited in the file of this patent

UNITED STATES PATENTS

| | | |
|---|---|---|
| 1,660,893 | Smith | Feb. 28, 1928 |
| 1,865,961 | Remy | July 5, 1932 |
| 1,905,394 | Hornung | Apr. 25, 1933 |
| 1,968,529 | Larson | July 31, 1934 |
| 2,468,439 | Gregorius | Apr. 26, 1949 |
| 2,557,442 | Kurilo | June 19, 1951 |
| 2,573,396 | Bryce | Oct. 30, 1951 |
| 2,715,866 | Mausel | Aug. 23, 1955 |